United States Patent
Watson et al.

(10) Patent No.: US 9,223,664 B1
(45) Date of Patent: Dec. 29, 2015

(54) ENERGY STORAGE FOR MEMORY PROTECTION DURING POWER EVENT

(71) Applicant: Amazon Technologies, Inc., Reno, NV (US)

(72) Inventors: Christopher Nathan Watson, Seattle, WA (US); Adam Douglas Morley, Seattle, WA (US); David Edward Bryan, Seattle, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 266 days.

(21) Appl. No.: 13/867,838

(22) Filed: Apr. 22, 2013

(51) Int. Cl.
*G06F 11/00* (2006.01)
*G06F 11/20* (2006.01)
*G06F 1/30* (2006.01)

(52) U.S. Cl.
CPC .............. *G06F 11/2015* (2013.01); *G06F 1/30* (2013.01)

(58) Field of Classification Search
CPC . G06F 11/1441; G06F 11/2015; G06F 1/263; G06F 1/268; G06F 1/28; G06F 1/30
USPC ...................................................... 714/24, 14
See application file for complete search history.

(56) References Cited

U.S. PATENT DOCUMENTS

| | | | | |
|---|---|---|---|---|
| 4,307,455 | A * | 12/1981 | Juhasz et al. ................... | 714/24 |
| 6,195,754 | B1 * | 2/2001 | Jardine et al. ................. | 713/324 |
| 6,304,981 | B1 * | 10/2001 | Spears et al. ................... | 714/24 |
| 7,536,506 | B2 * | 5/2009 | Ashmore et al. .............. | 711/114 |
| 7,954,006 | B1 * | 5/2011 | Mangipudi ..................... | 714/22 |
| 8,495,423 | B2 * | 7/2013 | Frost et al. ..................... | 714/24 |
| 8,819,368 | B2 * | 8/2014 | Sartore .......................... | 711/162 |
| 8,904,161 | B2 * | 12/2014 | Shim et al. ....................... | 713/2 |
| 2006/0136765 | A1 * | 6/2006 | Poisner et al. ................ | 713/323 |
| 2006/0139069 | A1 * | 6/2006 | Frank et al. ................... | 327/143 |
| 2009/0249087 | A1 * | 10/2009 | Wakrat et al. ................. | 713/300 |
| 2010/0195289 | A1 * | 8/2010 | Hubal ............................ | 361/733 |
| 2010/0332897 | A1 * | 12/2010 | Wilson .......................... | 714/14 |
| 2012/0284561 | A1 * | 11/2012 | Wilson .......................... | 714/14 |
| 2013/0318365 | A1 * | 11/2013 | Rumney ........................ | 713/300 |
| 2014/0250315 | A1 * | 9/2014 | Stenfort ............... | G06F 3/0605 713/323 |
| 2014/0258755 | A1 * | 9/2014 | Stenfort ........................ | 713/323 |
| 2014/0281151 | A1 * | 9/2014 | Yu ............................ | G06F 1/30 711/103 |

OTHER PUBLICATIONS

"ATA/ATAPI Power Management", http://wiki.osdev.org/ATA/ATAPI_Power_Management#ATA_STANDBY_mode, Mar. 23, 2008.

* cited by examiner

*Primary Examiner* — Marc Duncan
(74) *Attorney, Agent, or Firm* — Hogan Lovells US LLP

(57) ABSTRACT

An energy storage device included in a data center environment can supply energy to a set of solid state drives in the data center environment when power failure or another power event has occurred. In some embodiments, there can be a controller for each solid state drive. The controller can be configured to detect or determine the occurrence of the power failure or other power event and, in response, transmit a command to a respective solid state drive instructing the solid state drive to perform a graceful and atomic shutdown operation, so that data stored on the drive is made durable and the drive enters a quiescent state (e.g., sleep mode, hibernate mode, power-off mode, etc.). As such, the energy storage device can provide protection against power events to solid state drives that lack native (e.g., built-in, inherent, etc.) power protection mechanisms.

22 Claims, 9 Drawing Sheets

ENERGY STORAGE FOR MEMORY PROTECTION DURING POWER EVENT

BACKGROUND

Computing devices and computing platforms in networked environments are becoming more commonplace, are being used for a wider variety of purposes, and have an increasing amount of functionality. In some instances, businesses can provide computing platforms in networked environments to satisfy their customers' computing needs. For example, a customer can utilize computing resources, such as memory or data storage devices, in a networked data center environment provided by a business. The memory or data storage devices can be, for example, non-volatile memory such as solid state drives. In general, there can be enterprise solid state drives and consumer solid state drives. Enterprise solid state drives typically implement a conventional approach for handling a power event, such as a power failure. For example, each enterprise solid state drive can include a built-in mechanism for protecting its stored data during a power failure. Accordingly, enterprise solid state drives which implement built-in power event protection mechanisms are generally more expensive and more complicated than consumer solid state drives. Consumer solid state drives are less expensive and less complicated than enterprise solid state drives, but generally lack the built-in mechanisms employed by enterprise drives that protect against power events. Protection against power events is important, but cost, complexity, or other concerns can reduce the overall experience associated with using solid state drives.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to using memory devices. In particular, various embodiments of the present disclosure enable one or more solid state drives to be powered by an energy storage device during a power failure to the primary power source.

In some embodiments, a data center environment can include a set of solid state drives. The set of solid state drives can comprise one or more solid state drives. In some cases, the data center can include a set of servers, and each server can utilize at least one solid state drive. The set of solid state drives can be powered by at least one power source included in the data center. The solid state drives used by the data center can be less expensive and less complicated than higher grade versions of solid state drives. For example, the data center can use consumer-level solid state drives, rather than enterprise-level solid state drives. As such, the solid state drives used by the data center can lack native (i.e., built-in, inherent, etc.) power protection mechanisms. In the event of a power failure or other problem associated with the at least one power source, the solid state drives can malfunction, lose stored data, and/or shut down improperly since the drives lack native power protection mechanisms.

Various embodiments of the present disclosure enable at least one energy storage device included in the data center to supply energy to the set of solid state drives when the at least one power source experiences a power failure or other problem. In some embodiments, there can be a controller for each of the solid state drives. In one example, each controller can be configured to detect or determine the occurrence of a power event (e.g., power failure, unexpected power loss, poor power quality, under-voltage power delivery, deviation from normal power delivery, etc.) and, in response, transmit a command to a respective solid state drive instructing the solid state drive to perform a graceful and atomic shutdown operation, so that data stored on the drive is made durable and the drive enters a quiescent state (e.g., sleep mode, hibernate mode, power-off mode, etc.). As such, solid state drives without native power protection can be protected against power events utilizing the energy storage device(s) in accordance with the present disclosure.

Various other functions and advantages are described and suggested below as may be provided in accordance with the various embodiments.

Figure 1:
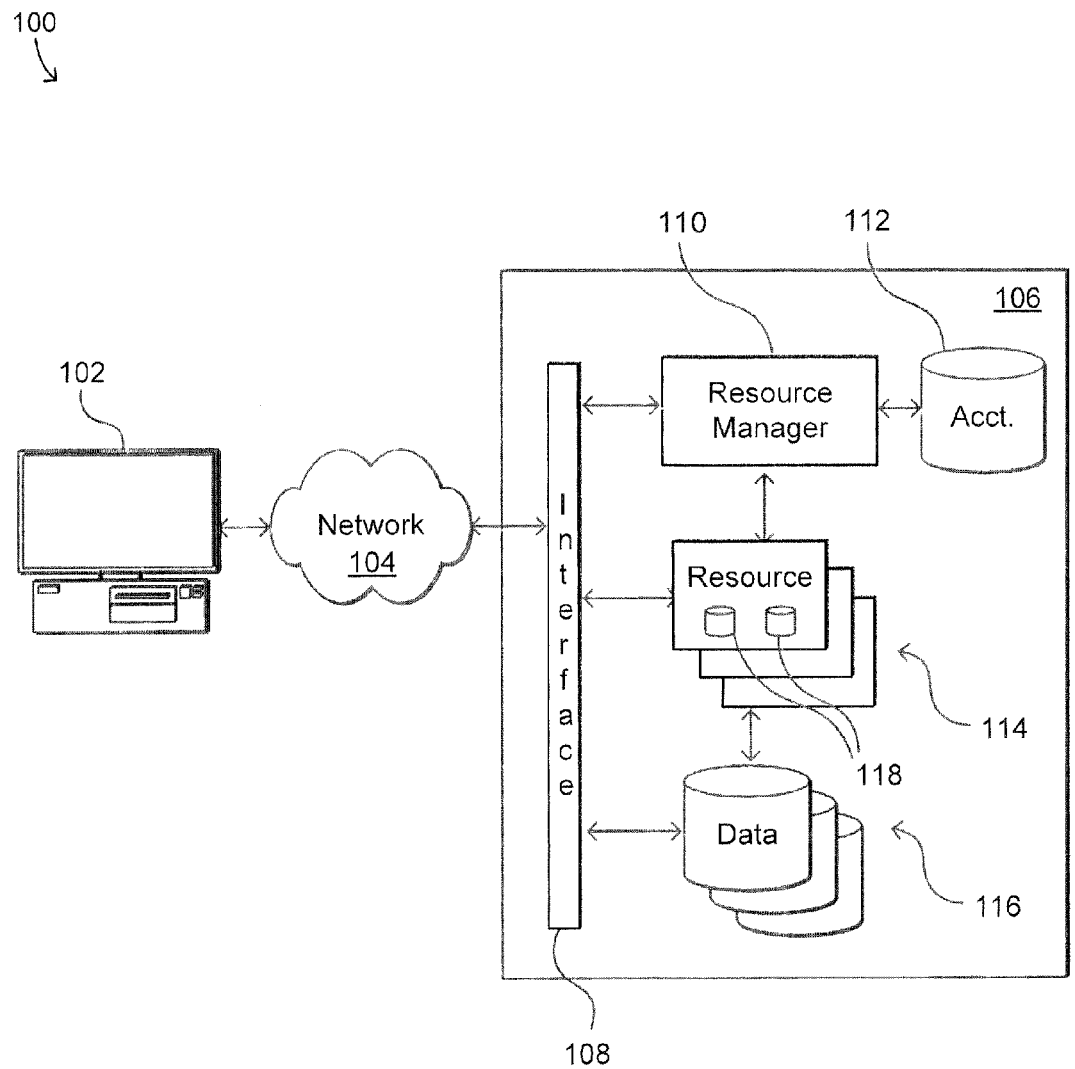
FIG. 1 illustrates an example environment in which aspects of the various embodiments can be utilized.

FIG. 1 illustrates an example environment 100 in which aspects of the various embodiments can be implemented. In this example a user is able to utilize a client computing device 102 to communicate across at least one network 104 with a resource provider environment 106. The client computing device (i.e., client device, client, etc.) can include any appropriate electronic device operable to send and receive requests, messages, or other such information over an appropriate network and convey information back to a user of the device. Examples of such client devices include personal computers, tablet computers, smart phones, notebook computers, and the like (see FIG. 7 and FIG. 8 for more details). The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
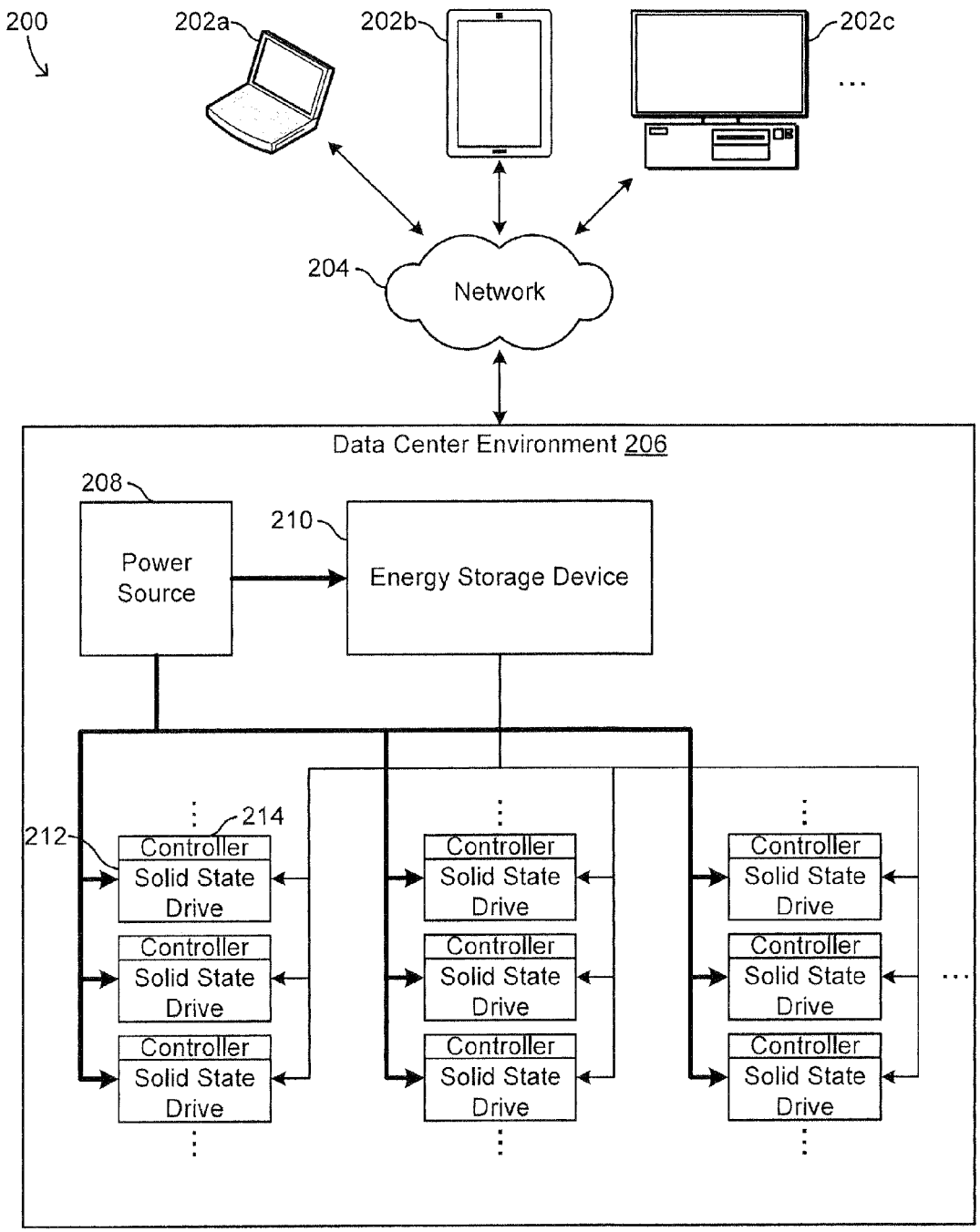
FIG. 2 illustrates an example system embodiment for centralized energy storage useful for protecting memory during a power event.

FIG. 2 illustrates an example system embodiment 200 for centralized energy storage useful for protecting memory during a power event. In FIG. 2, there can be, for example, client computing devices (e.g., 202a, 202b, 202c, etc.), a network 204, and a data center environment 206 or other similar environment for accommodating computing devices, computing systems, servers, memory/data storage devices, and/or other related components. Each of the example client computing devices (e.g., 202a, 202b, 202c, etc.) can correspond to the client device 102 of FIG. 1 (also refer to FIG. 7 and FIG. 8 for more details), the network 204 can correspond to the network 104 of FIG. 1, and the data center environment 206 can correspond to the resource provider environment 106 of FIG. 1.

As shown in FIG. 2, the example data center environment 206 can include a power source 208, an energy storage device 210, and a set of solid state drives (e.g., 212). In some embodiments, the set of solid state drives can correspond to at least one solid state drive. The set of solid state drives can utilize NAND-based flash memory. In some embodiments, each solid state drive can be included with a server (not shown in FIG. 2) of the data center environment 206. In other words, there can be servers in the data center 206 and each server can include at least one solid state drive in the set of solid states drives.

Moreover, in some embodiments, there can be a controller (e.g., 214) for each solid state drive (e.g., 212). The controller can be external to the solid state drive, but can be communicatively connected and operable to work in conjunction with the solid state drive. In some embodiments, the controller can be configured to monitor the power supplied to the solid state drive from the power source 208.

In one example, the set of solid state drives in the data center environment 206 can include one or more cost effective solid state drives, each of which can lack a native (e.g., built-in, inherent, etc.) power protection mechanism. In the example, the solid state drives can correspond to consumer solid state drives. To make up for the lack of native power protection, the data center 206 can employ a "centralized" system to protect against power failure. In the example, the centralized system to protect against power failure can allow less expensive, consumer-grade solid state drives to be used in the data center 206, without having to sacrifice the power protection natively employed in more expensive (e.g., enterprise-grade) solid state drives. The centralized system can provide a centralized energy storage device 210 to protect against power failures and other events.

In the example, the power source 208 can provide energy or power to the set of solid state drives, among other component of the data center 206. In some embodiments, the controller (e.g., 214) for each solid state drive (e.g., 212) can be powered by the power source 208 as well. Further, the power source 208 can also provide energy to the energy storage device 210. The energy storage device 210 can charge up, store, or reserve the energy provided. In some embodiments, the energy storage device 210 can be associated with or implemented using at least one of a capacitor, a supercapacitor, a kinetic energy storage device, and/or a battery, etc.

Continuing with the example, in the case that a power event occurs with respect to the set of solid state drives (e.g., a power failure at the power source 208 that provides power to the solid state drives), the controllers (e.g., 214) can detect the power event and transmit signals to the set instructing the set of solid state drives to perform graceful (and atomic) shutdowns. Since the power source 208 is experiencing the power event, the energy storage device 210 can provide the reserved energy to the set of solid state drives in order for the drives to perform the graceful shutdowns.

In some embodiments, the graceful shutdown operation to be performed by a solid state drive can include making data stored at the solid state drive durable, such that the data survives for a long time (e.g., exceeding a time threshold, etc.) and is not lost when there is no power to the solid state drive. Durability can refer to the characteristic in which once a transaction (e.g., a single logical operation on data in a data store) is committed, the transaction will remain so, even in the event of power loss, crashes, errors, or other problems. In some embodiments, the disclosed technology can periodically power up the solid state drive (e.g., NAND device) so that the controller(s) can perform maintenance operations to ensure data integrity, for example, including (but not limited to) data verification. In one example, a group of statements can execute in a data store, generating a set of results; the results are durable if they are stored permanently or for a sufficiently long time (even if the data store crashes immediately thereafter the statement execution). In some embodiments, the graceful shutdown operation can also include tasks such as flushing temporary data stored in one or more caches of the solid state drive, performing at least one error check with respect to the data stored at the solid state drive, or entering into a quiescent state. The quiescent state can include, for example, a sleep mode, a hibernate mode, or a power-off mode, etc.

As such, utilizing the centralized energy storage device 210, the data center 206 can employ less expensive or relatively lower grade solid state drives without having to implement significant alterations/customizations to the drives and without having to sacrifice protection against power events. Furthermore, in some embodiments, a centralized energy storage device 210 is easier to maintain (e.g., service, repair, etc.). For example, instead of maintaining multiple power protection mechanisms native to multiple solid state drives, only a single centralized energy storage device 210 needs to be maintained.

Figure 3:
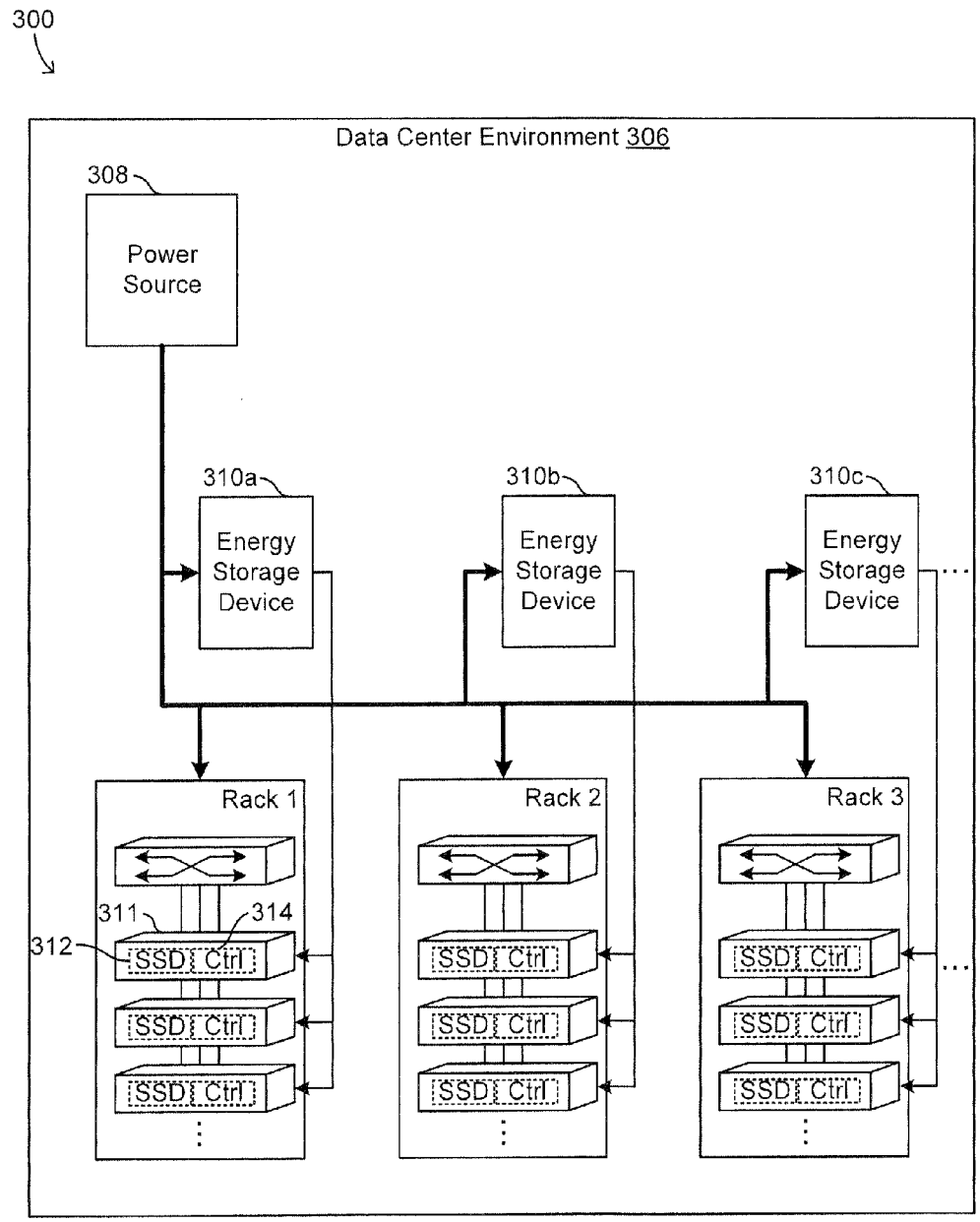
FIG. 3 illustrates an example system embodiment for distributed energy storage useful for protecting memory during a power event.

FIG. 3 illustrates an example system embodiment 300 for distributed energy storage useful for protecting memory during a power event. In the system embodiment 300, there can be an example data center environment 306. In some embodiments, the example data center 306 can include at least one power source 308 and a plurality of energy storage devices (e.g., 310a, 310b, 310c, etc.). The data center 306 can also include a plurality of server racks (e.g., "Rack 1", "Rack 2", "Rack 3", etc.). Each server rack can hold a plurality of servers (e.g., 311). Each server (e.g., 311) can comprise, among other components, at least one solid state drive ("SSD") (e.g., 312). Moreover, there can be a controller ("Ctrl") (e.g., 314) for a respective solid state drive (e.g., 312).

As shown in FIG. 3, the power source 308 can provide energy or power to the server racks, including various elements on each server rack, and to the energy storage devices (e.g., 310a, 310b, 310c, etc.). If there is a power event such that the power source 308 cannot properly provide power to the server racks, including the servers and solid state drives, then the energy storage devices (e.g., 310a, 310b, 310c, etc.) can initiate the supply of back-up energy to the server racks, the servers, and/or the solid state drives. The controllers can detect the power event and instruct their respective solid state drives to perform graceful shutdown operations. The graceful shutdown operation can include making data stored on a solid state drive durable, checking that there are no errors at the solid state drive, and/or having the drive enter into a quiescent state.

Figure 4:
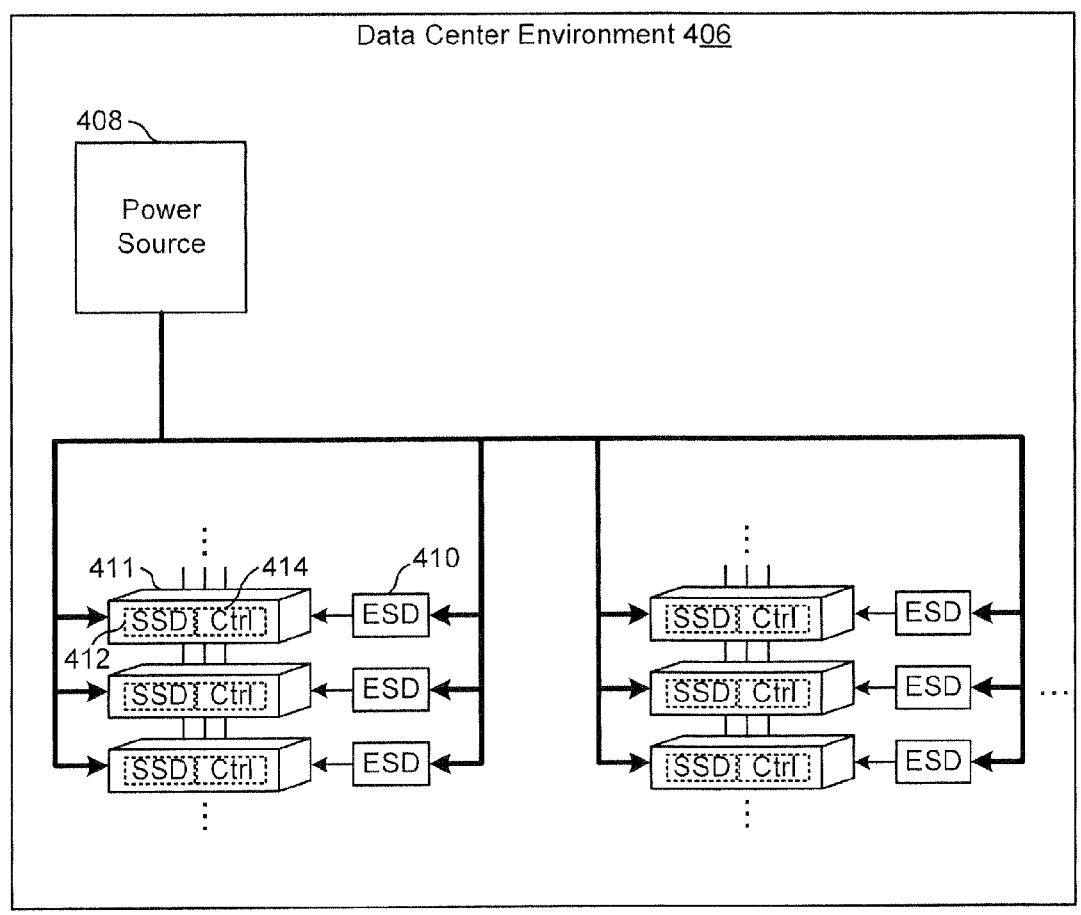
FIG. 4 illustrates an example system embodiment for distributed energy storage useful for protecting memory during a power event.

FIG. 4 illustrates an example system embodiment 400 for distributed energy storage useful for protecting memory during a power event. In the system embodiment 400 of FIG. 4, a data center environment 406 can include at least one power source 408, a plurality of energy storage devices ("ESD") (e.g., 410), and a plurality of servers (e.g., 411). Each server can comprise a solid state drive (e.g., 412) and a corresponding controller (e.g., 414). In some embodiments, the power source 408 can supply energy to the solid state drives (e.g., 412) as well as to the energy storage devices (e.g., 410).

The energy storage devices (e.g., 410) can charge up, store, or reserve the energy provided to them by the power source 408. In one example, if the power source 408 experiences a failure or other problem, the energy storage devices can provide the reserved energy to the solid state drives, while the controllers instruct the drives to gracefully shut down. In some embodiments, the solid state drives can be required to perform a graceful shutdown within an allowable time period (e.g., specified by an entity associated with the data center 406). For example, a representative of the data center 406 can require the vendor or manufacturer of the solid state drives to provide drives that can gracefully shut down within an allowable time period (e.g., 16 milliseconds).

Figure 5:
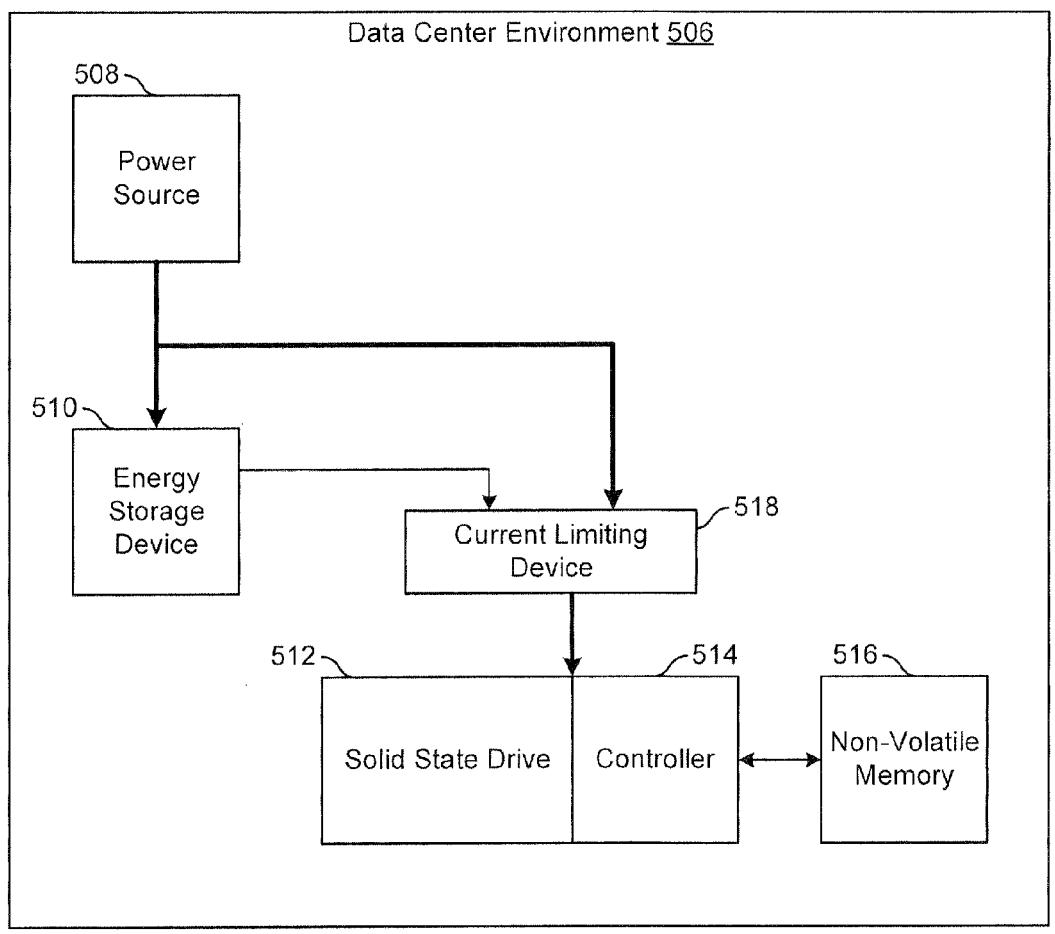
FIG. 5 illustrates an example system embodiment for energy storage useful for protecting memory during a power event.

FIG. 5 illustrates an example system embodiment 500 for energy storage useful for protecting memory during a power event. FIG. 5 shows a data center 506 with a power source 508, an energy storage device 510, and a solid state drive 512 with a corresponding controller 514. As shown in FIG. 5, there can be non-volatile memory 516 that is communicatively connected to the controller 514 and/or to the solid state drive 512. In some embodiments, the solid state drive 512 can provide a response indicating whether or not the drive 512 was able to successfully perform a graceful shutdown during the power event. The response or indication can be stored in the non-volatile memory 516, which can be a single bit of non-volatile memory, for example. The response or indication stored at the non-volatile memory 516 can be useful for recovering data and/or restoring the solid state drive 512 to normal operations upon resolving the power event or other problem. In some cases, there can be an amount of non-volatile memory for each solid state drive and/or energy storage device. In some cases, there can be an amount of non-volatile memory for a group of solid state drives and/or energy storage devices, such as for a server rack.

Moreover, in some embodiments, there can be a current limiting device 518 configured to switch between having the power source 508 provide energy to the solid state drive 512 (and controller 512) and having the energy storage device 510 provide energy upon the occurrence of the power event.

Figure 6A:
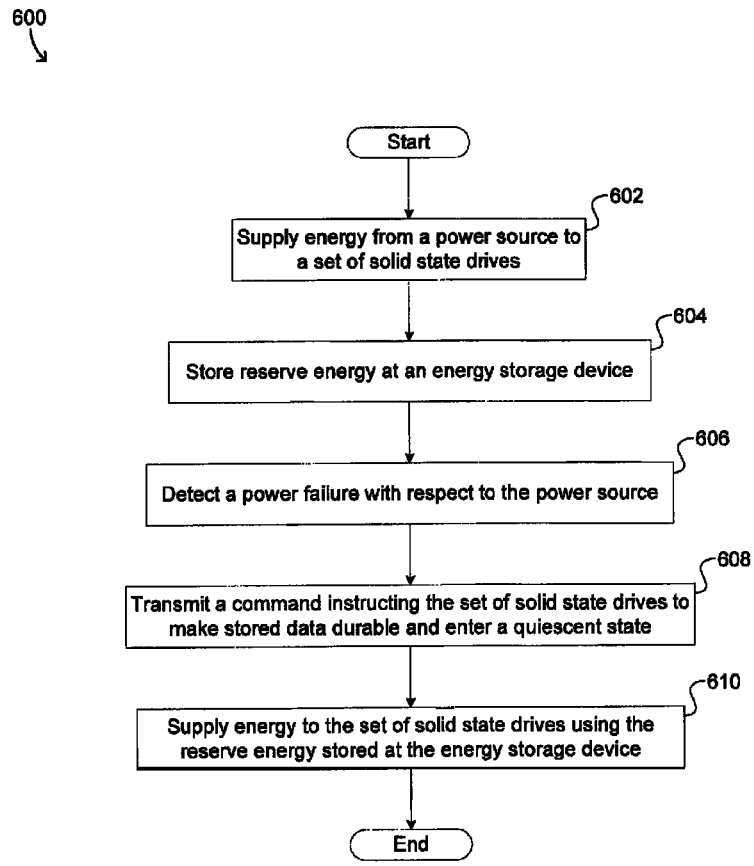
FIG. 6A illustrates an example method embodiment for energy storage useful for protecting memory during a power event.

FIG. 6A illustrates an example method embodiment 600 for energy storage useful for protecting memory during a power event. It should be understood that there can be additional, fewer, or alternative steps performed in similar or alternative orders, or in parallel, within the scope of the various embodiments unless otherwise stated. The example method embodiment 600 can start with supplying energy from a power source to a set of solid state drives, at step 602. The set of solid state drives can be configured to store data. At step 604, the method 600 can store reserve energy at an energy storage device external to the set of solid state drives. In some embodiments, the reserve energy can be stored at the energy storage device using, at least in part, the power source.

Step 606 can include detecting, at a controller external to the set of solid state drives, an occurrence of a power failure with respect to the power source. Step 608 can include transmitting, from the controller to the set of solid state drives, a command instructing the set of solid state drives to, within a specified time period, make the stored data durable and enter a quiescent state. Then at step 610, the method can supply energy to the set of solid state drives. The supplying of the energy in Step 610 can use, at least a portion of, the reserve energy stored at the energy storage device when the set is making the stored data durable and entering the quiescent state.

Figure 6B:
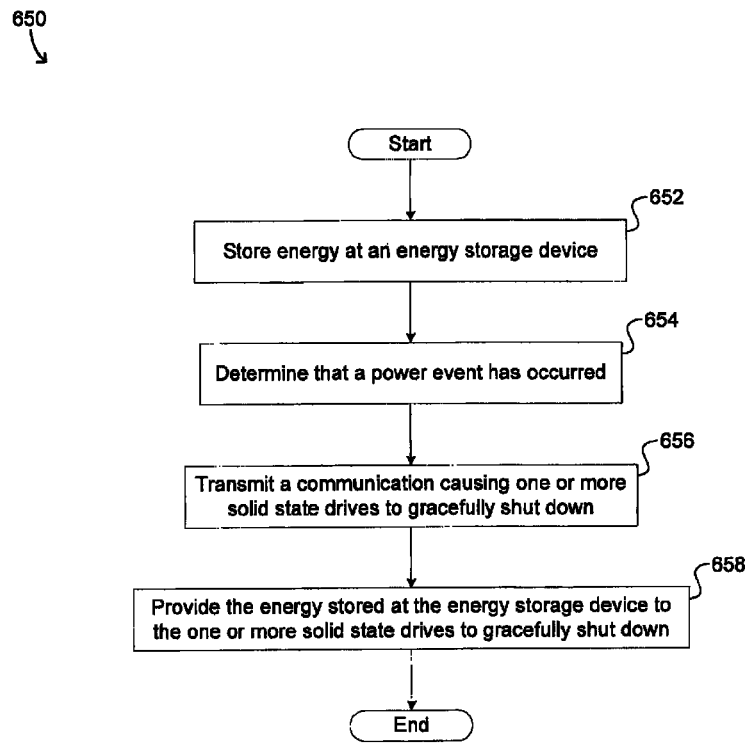
FIG. 6B illustrates an example method embodiment for energy storage useful for protecting memory during a power event.

FIG. 6B illustrates an example method embodiment 650 for energy storage useful for protecting memory during a power event. Again, it should be understood that there can be additional, fewer, or alternative steps performed in similar or alternative orders, or in parallel, within the scope of the various embodiments unless otherwise stated. At step 652, the example method embodiment 650 can store energy at an energy storage device external to one or more solid state drives. At step 654, the method 650 can determine, at a controller external to the one or more solid state drives, that a power event has occurred with respect to the one or more solid state drives.

Step 656 can include transmitting a communication causing the one or more solid state drives to perform a graceful shutdown operation. In some embodiments, graceful shutdown operation can be performed within an allowable time period. The communication can be transmitted from the controller to the one or more solid state drives. Then step 658 can include providing at least a portion of the energy stored at the energy storage device to the one or more solid state drives in order for the one or more solid state drives to perform the graceful shutdown operation.

In some embodiments, the energy storage device can comprise an array of capacitors, supercapacitors, and/or batteries, etc. Also, in some embodiments, the energy storage device can reside with a backplane that holds the set of solid state drives. Additionally, in some embodiments, the amount of energy stored at the energy storage device can be varied or customized depending on how long the reserve energy needs to last in order for the solid state drive(s) to shut down gracefully.

In some embodiments, the communication (e.g., command, instruction, signal, etc.) from the controller to a corresponding solid state drive(s) to gracefully shut down can correspond to a command that triggers the one or more solid state drives to enter into a quiescent state. For example, the communication can be an ATA STANBY IMMEDIATE command that causes the drive(s) to enter an ATA STANDBY mode.

Furthermore, in some embodiments, the controller can also monitor for one or more problems that can occur with respect to the energy storage device(s), the one or more solid state drives, and/or the power source. In some embodiments, the controller can determine whether or not the one or more solid state drives are valid for storing a specified classification (e.g., kind, type, class, etc.) of data. For example, the one or more solid state drives can run various processes or error checks to ensure that the drives are suitable for storing the data. In some embodiments, if a solid state drive is in trouble due to the power failure, the controller can rescue the solid state drive. In some embodiments, the controller and/or solid state drive can log one or more tasks completed by the drive during the graceful shutdown operation.

In some embodiments, the controller can be implemented using software. In some embodiments, the controller can be implemented using circuitry, such as a general purpose central processing unit (CPU) programmed by instructions, an application-specific integrated circuit (ASIC) designed to carry out various functions of the controller, and/or a field-programmable gate array (FPGA) programmed to carry out various functions of the controller (e.g., monitoring, facilitating power delivery, issuing shut-down commands, etc.). Moreover, in some embodiments, the controller can be implemented using a combination of software and hardware.

It is also contemplated that a person having ordinary skill in the art would recognize that there can be many variations, different implements, and/or other embodiments consistent with the scope of the present disclosure.

Figure 7:
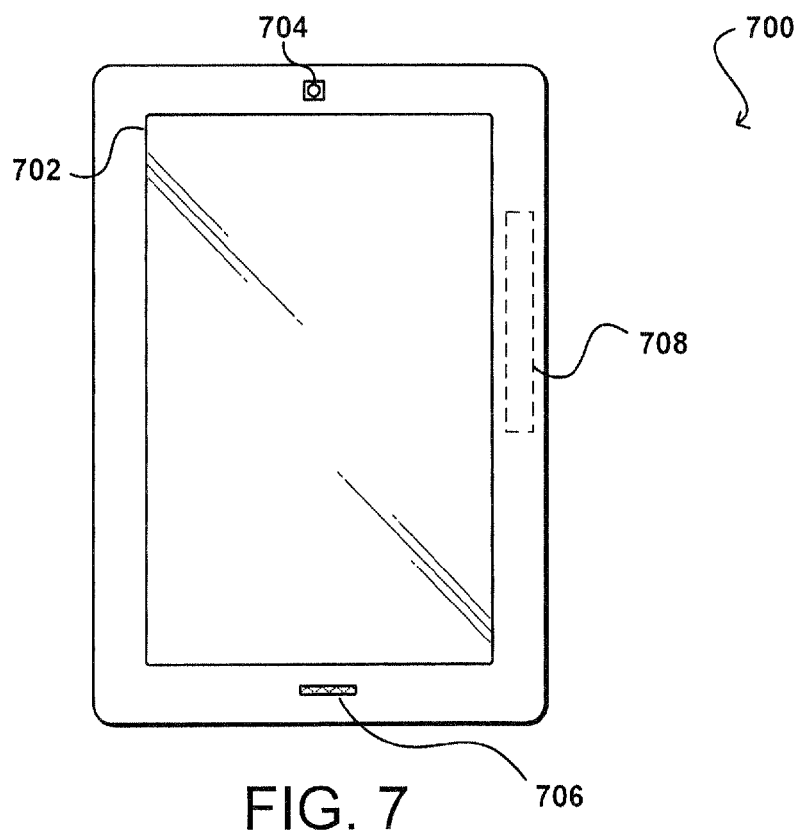
FIG. 7 illustrates an example device that can be used to implement aspects of the various embodiments.

FIG. 7 illustrates an example electronic user device 700 that can be used in accordance with various embodiments. In some embodiments, the example electronic user device 700 can correspond to the client computing device 102 of FIG. 1. Although a portable computing device (e.g., an electronic book reader or tablet computer) is shown in FIG. 7, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
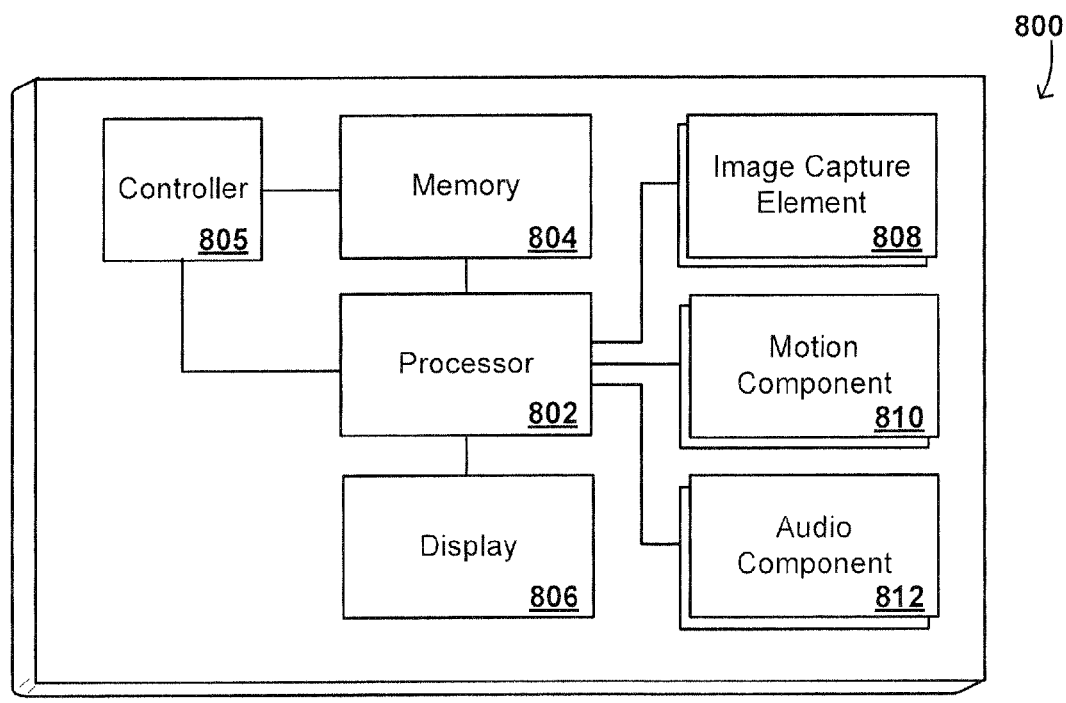
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. In some embodiments, the memory can be a solid state drive, such as a NAND memory device. As shown in FIG. 8, in some embodiments, the device can include a controller 805. As discussed previously, in some embodiments, the controller 805 can be implemented using software. The controller 805 can also be implemented using circuitry, such as a general purpose central processing unit (CPU) programmed by instructions, an application-specific integrated circuit (ASIC) designed to carry out various functions of the controller, and/or a field-programmable gate array (FPGA) programmed to carry out various functions of the controller (e.g., monitoring, facilitating power delivery, issuing shut-down commands, etc.). Moreover, in some embodiments, the controller 805 can be implemented using a combination of software and hardware.

The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (UPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
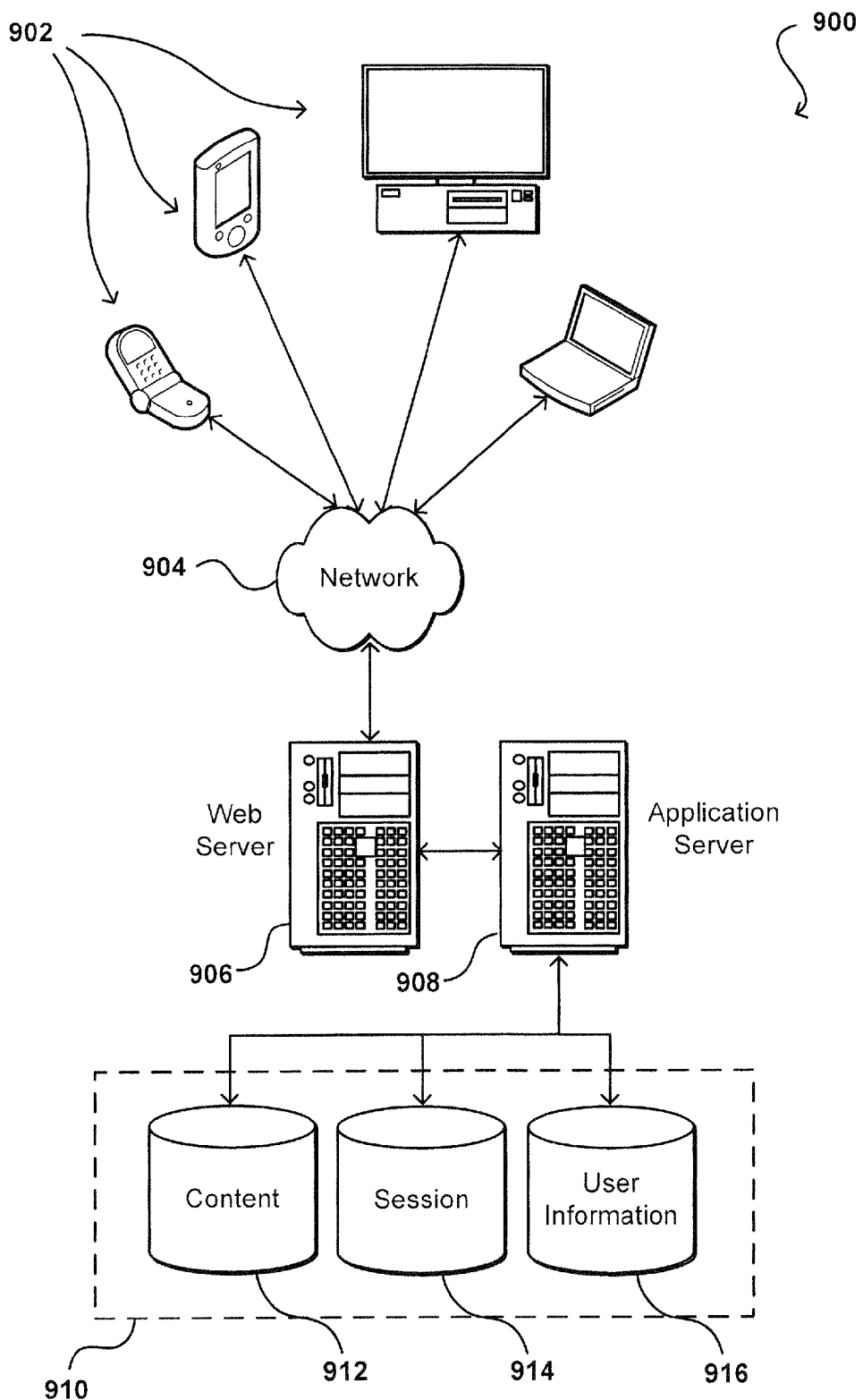
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906, It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    supplying energy from a power source to a set of solid state drives, the set of solid state drives being configured to store data;
    storing reserve energy at an energy storage device external to the set of solid state drives, the reserve energy being stored at the energy storage device using, at least in part, the power source;
    detecting, at a controller external to the set of solid state drives, an occurrence of a power failure with respect to the power source;
    transmitting, from the controller to the set of solid state drives, one or more commands instructing the solid state drives of the set to make the stored data durable, and enter a quiescent state within a specified time period;
    supplying, during the specified time period, energy to the set of solid state drives using at least a portion of the reserve energy stored at the energy storage device after detecting the power failure event with respect to the power source; and
    supplying, periodically during the power failure and after the set of solid state drives have entered the quiescent state, energy to the set of solid state drives using at least a portion of the reserve energy stored at the energy storage device in order to power a maintenance operation at the set of solid state drives.

2. The computer-implemented method of claim 1, further comprising:
    storing, in non-volatile memory, one or more indications of whether or not the solid state drives successfully made the stored data durable and entered the quiescent state.

3. The computer-implemented method of claim 1, wherein the energy storage device includes at least one of a capacitor, a supercapacitor, a kinetic energy storage device, or a battery.

4. The computer-implemented method of claim 1, wherein the controller is configured to monitor at least one of the energy storage device or the set of solid state drives for failures.

5. A computer-implemented method comprising:
    determining, at a controller, that a power event has occurred with respect to one or more solid state drives, the controller residing externally with respect to the one or more solid state drives;
    transmitting, from the controller to the one or more solid state drives, a communication causing the one or more solid state drives to perform a graceful shutdown operation within a specified time period;
    causing at least a portion of energy stored at an energy storage device external to the one or more solid state drives to be supplied to the one or more solid state drives during the specified time period in order to power the one or more solid state drives during the graceful shutdown operation; and
    supplying, periodically during the power event and after the solid state drives have performed the graceful shutdown operation, an additional portion of the energy stored at the energy storage device to the solid state drives in order to power the solid state drives during a maintenance operation.

6. The computer-implemented method of claim 5, further comprising:
    causing information to be stored in non-volatile memory, the information indicating whether or not the one or more solid state drives successfully performed the graceful shutdown operation.

7. The computer-implemented method of claim 6, wherein the information further comprises data logs of one or more tasks completed by the one or more solid state drives, the one or more tasks being associated with performance of the graceful shutdown operation.

8. The computer-implemented method of claim 5, wherein performing the graceful shutdown operation further comprises at least one of making data stored at the one or more solid state drives durable, flushing temporary data stored in one or more caches of the one or more solid state drives, performing at least one error check with respect to the data stored at the one or more solid state drives, or entering into a quiescent state.

9. The computer-implemented method of claim 5, wherein the one or more solid state drives correspond to a plurality of solid state drives, and wherein the energy storage device is configured to provide energy to at least the plurality of solid state drives during the power event.

10. The computer-implemented method of claim 9, wherein the plurality of solid state drives are associated with a server rack, and wherein the energy storage device is configured to provide energy to the server rack during the power event.

11. The computer-implemented method of claim 5, wherein the one or more solid state drives correspond to a single solid state drive and wherein the energy storage device is configured to provide energy to the single solid state drive.

12. The computer-implemented method of claim 5, wherein the energy storage device includes at least one of a capacitor, a supercapacitor, a kinetic energy storage device, or a battery.

13. The computer-implemented method of claim 5, wherein each of the one or more solid state drives lacks a native power protection mechanism.

14. The computer-implemented method of claim 5, wherein the communication causing the one or more solid state drives to perform a graceful shutdown operation corresponds to a command that triggers the one or more solid state drives to enter into a quiescent state.

15. The computer-implemented method of claim 5, further comprising:
monitoring, at the controller, for a problem that occurs with respect to the one or more solid state drives; and
determining whether the one or more solid state drives are valid for storing a specified classification of data.

16. A system comprising:
an energy storage device residing external to one or more solid state drives;
a controller residing external to the one or more solid state drives;
at least one processor; and
a memory device including instructions that, when executed by the at least one processor, cause the system to:
determine, at the controller, that a power event has occurred with respect to the one or more solid state drives;
transmit, from the controller to the one or more solid state drives, a communication causing the one or more solid state drives to perform a graceful shutdown operation within an allowable time period;
cause at least a portion of energy stored at the energy storage device to be supplied to the one or more solid state drives during the allowable time period in order to perform the graceful shutdown operation; and
supply, periodically during the power event and after the solid state drives have performed the graceful shutdown operation, an additional portion of the energy stored at the energy storage device to the one or more solid state drives in order to perform a maintenance operation at the one or more solid state drives.

17. The system of claim 16, further comprising:
a power source configured to provide energy to the one or more solid state drives, wherein the power event corresponds to a power failure occurring with respect to the power source, and wherein the power source is further configured to provide the energy that is stored at the energy storage device.

18. The system of claim 17, further comprising:
a current limiting device configured to facilitate the providing of the energy stored at the energy storage device to the one or more solid state drives when the power event occurs with respect to the power source.

19. The system of claim of claim 16, further comprising:
an amount of non-volatile memory configured to store an indication of whether or not the one or more solid state drives successfully performed the graceful shutdown operation.

20. A system comprising:
one or more solid state drives configured to perform a graceful shutdown operation in response to receiving a graceful shutdown signal;
a controller including circuitry configured to determine that a power event has occurred with respect to the one or more solid state drives, wherein the controller resides externally with respect to the one or more solid state drives, and wherein the controller is further configured to transmit a graceful shutdown signal to the one or more solid state drives based, at least in part, on the determining that the power event has occurred; and
an energy storage device configured to store energy, wherein the energy storage device resides externally with respect to the one or more solid state drives, and wherein the energy storage device is further configured to supply at least a portion of the energy to the one or more solid state drives, the at least the portion of the energy being useful to the one or more solid state drives for performing the graceful shutdown operation, and wherein the energy storage device is further configured to supply, periodically during the power event and after the solid state drives have performed the graceful shutdown operation, at least an additional portion of the energy to the one or more solid state drives, the at least an additional portion of the energy being useful to the one or more solid state drives for performing a maintenance operation.

21. The system of claim 20, further comprising:
an amount of non-volatile memory configured to store an indication of whether or not the one or more solid state drives successfully performed the graceful shutdown operation.

22. The system of claim 20, wherein performing the grace shutdown operation comprises at least one of making data stored at the one or more solid state drives durable, flushing temporary data stored in one or more caches of the one or more solid state drives, performing at least one error check with respect to the data stored at the one or more solid state drives, or entering into a quiescent state.

* * * * *